United States Patent [19]

Taylor et al.

[11] 4,362,457
[45] Dec. 7, 1982

[54] COTTON LOADER AND PACKER

[75] Inventors: Chauncey D. Taylor, Morgan; Herbert E. Sims, Blakely, both of Ga.

[73] Assignee: Hydrapak Corporation, Blakely, Ga.

[21] Appl. No.: 165,044

[22] Filed: Jul. 1, 1980

[51] Int. Cl.³ .............................................. B60P 1/02
[52] U.S. Cl. ..................................... 414/345; 298/27; 298/35 R
[58] Field of Search ........................ 298/10, 11, 24, 25, 298/26, 27, 29, 31, 33, 35 R, 35 M, 36; 414/340, 341, 345, 414, 422, 458, 460, 471, 495; 105/246, 260

[56] References Cited

U.S. PATENT DOCUMENTS

| 1,622,201 | 3/1927 | Little | 298/11 X |
| 2,304,622 | 12/1942 | Barrett | 298/31 X |
| 3,300,071 | 1/1967 | Isaacs | 414/458 |
| 3,672,724 | 6/1972 | Neuzil | 298/27 |
| 3,834,568 | 9/1974 | Larson et al. | 414/458 X |
| 3,880,468 | 4/1975 | Steingas et al. | 298/11 |
| 4,148,527 | 4/1979 | Steel | 298/10 |

FOREIGN PATENT DOCUMENTS

| 2381461 | 10/1978 | France | 298/35 R |
| 659727 | 1/1964 | Italy | 414/495 |
| 840254 | 7/1960 | United Kingdom | 414/471 |

Primary Examiner—Leslie J. Paperner
Attorney, Agent, or Firm—Sutherland, Asbill & Brennan

[57] ABSTRACT

A vehicle for carrying cotton from a mechanical picker to a cotton trailer, and for tamping the cotton down while in the bed of the trailer, is disclosed. The vehicle is constructed with a U-shaped base and has one open end for straddling the cotton trailer. A bottom-dumping basket which can be raised to clear the sides of the trailer, emptied into the trailer, and then lowered into the bed to tamp the cotton down, is mounted in the center of the vehicle.

15 Claims, 10 Drawing Figures

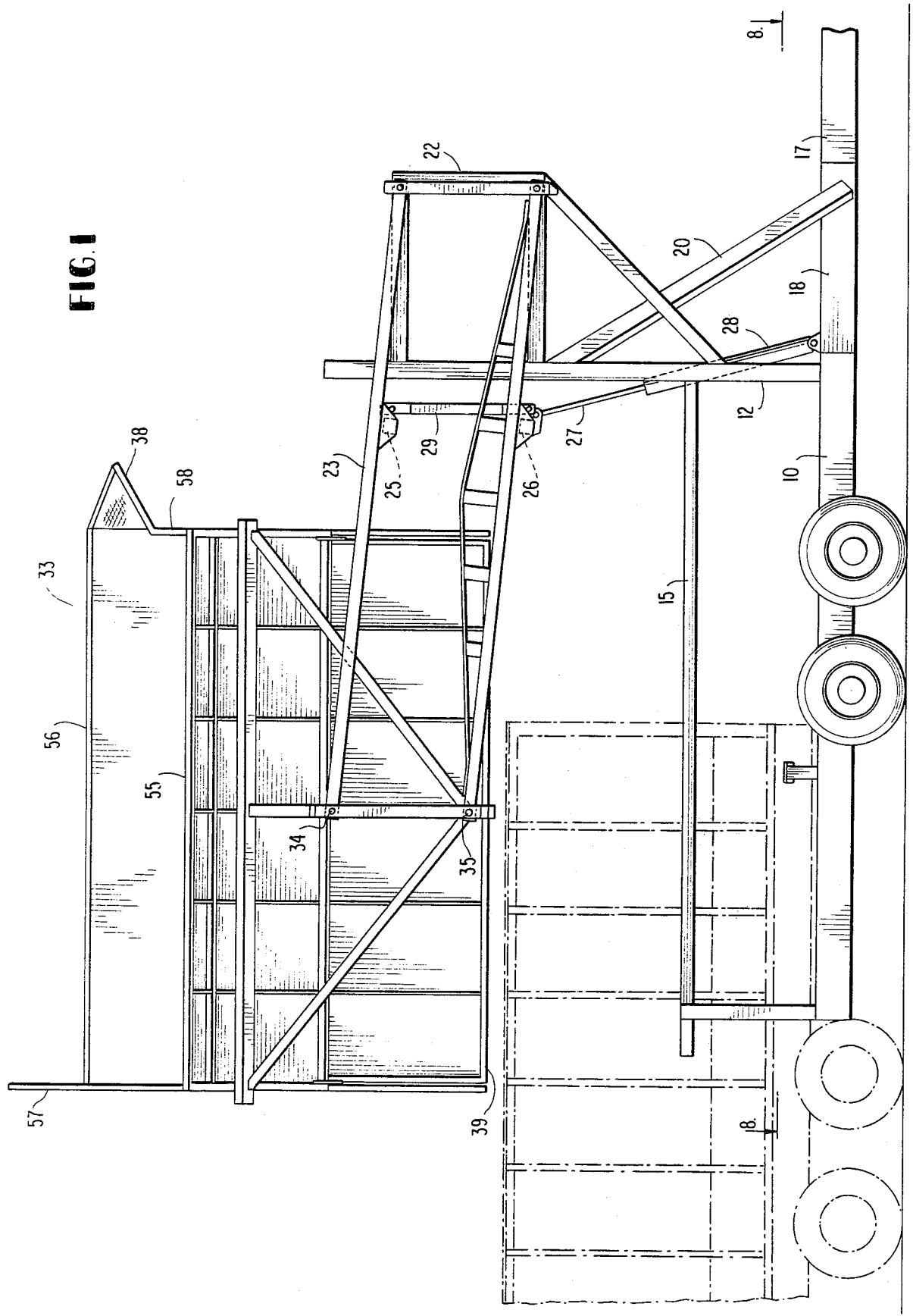

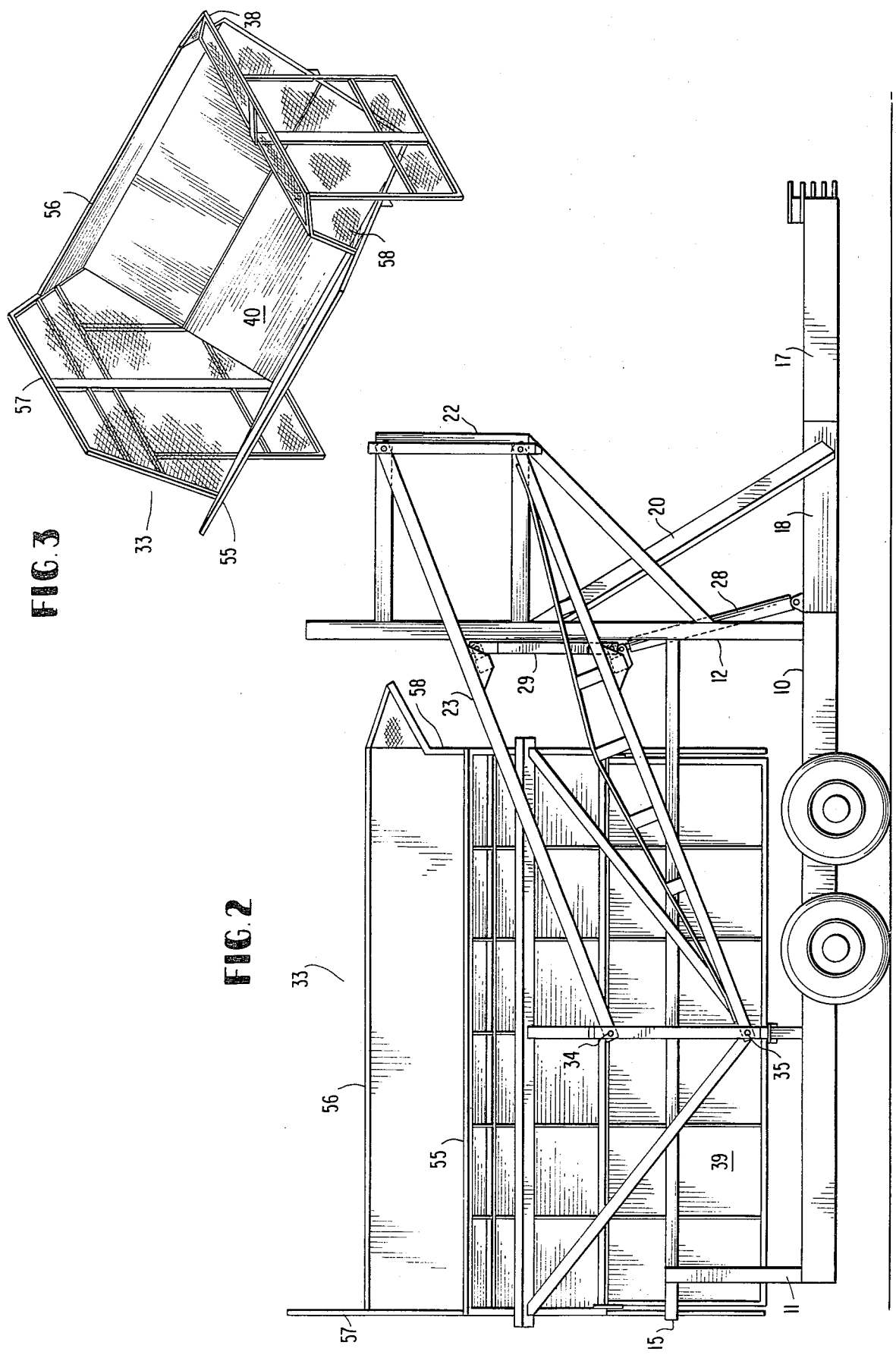

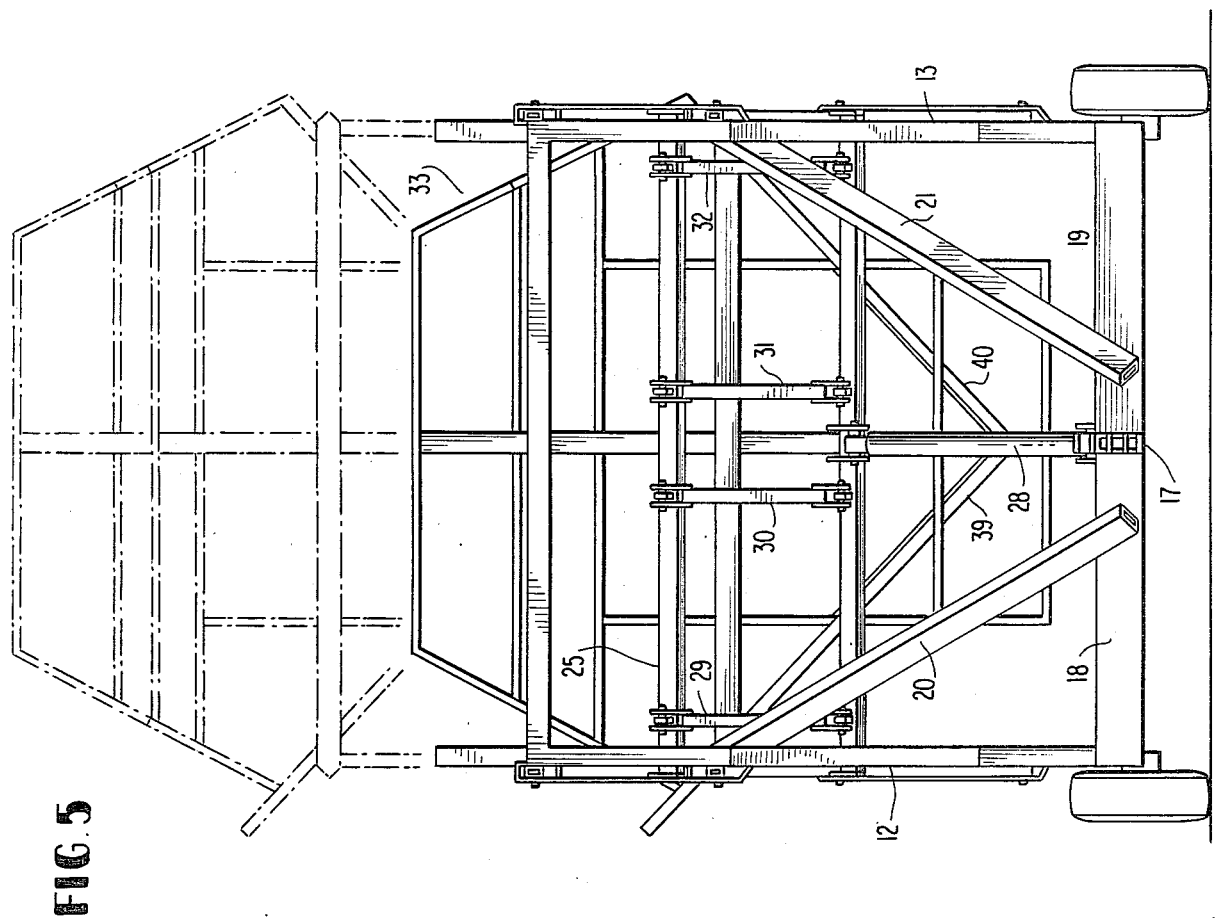
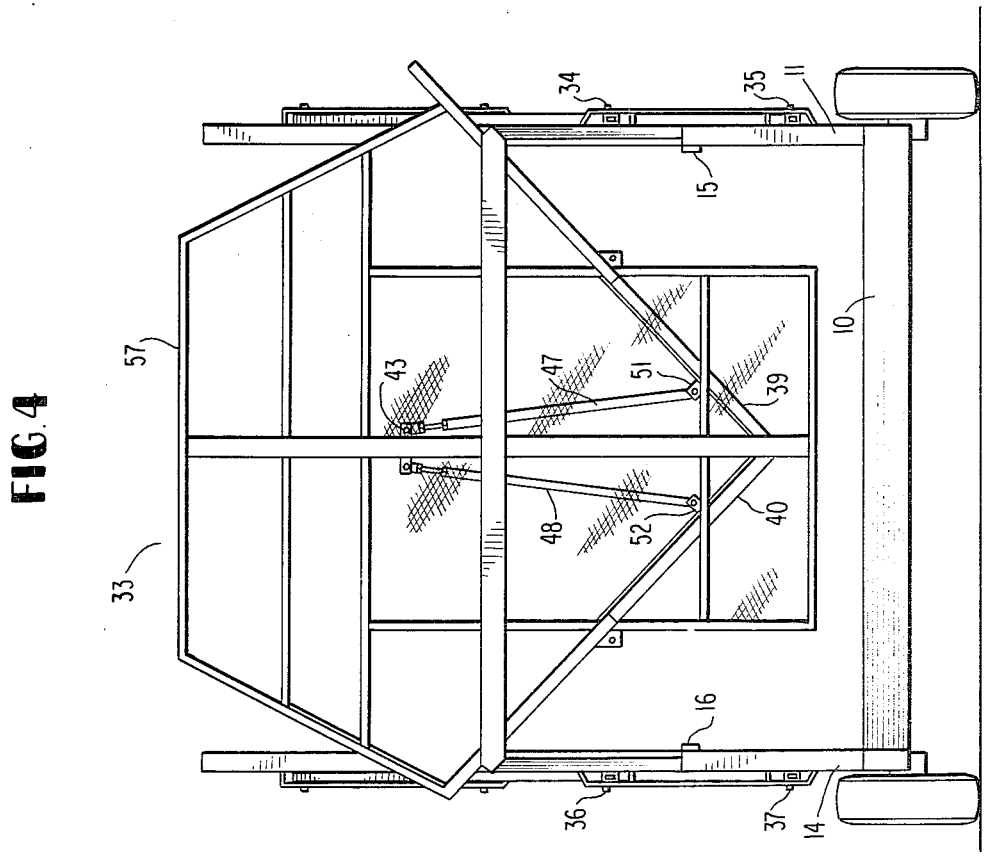

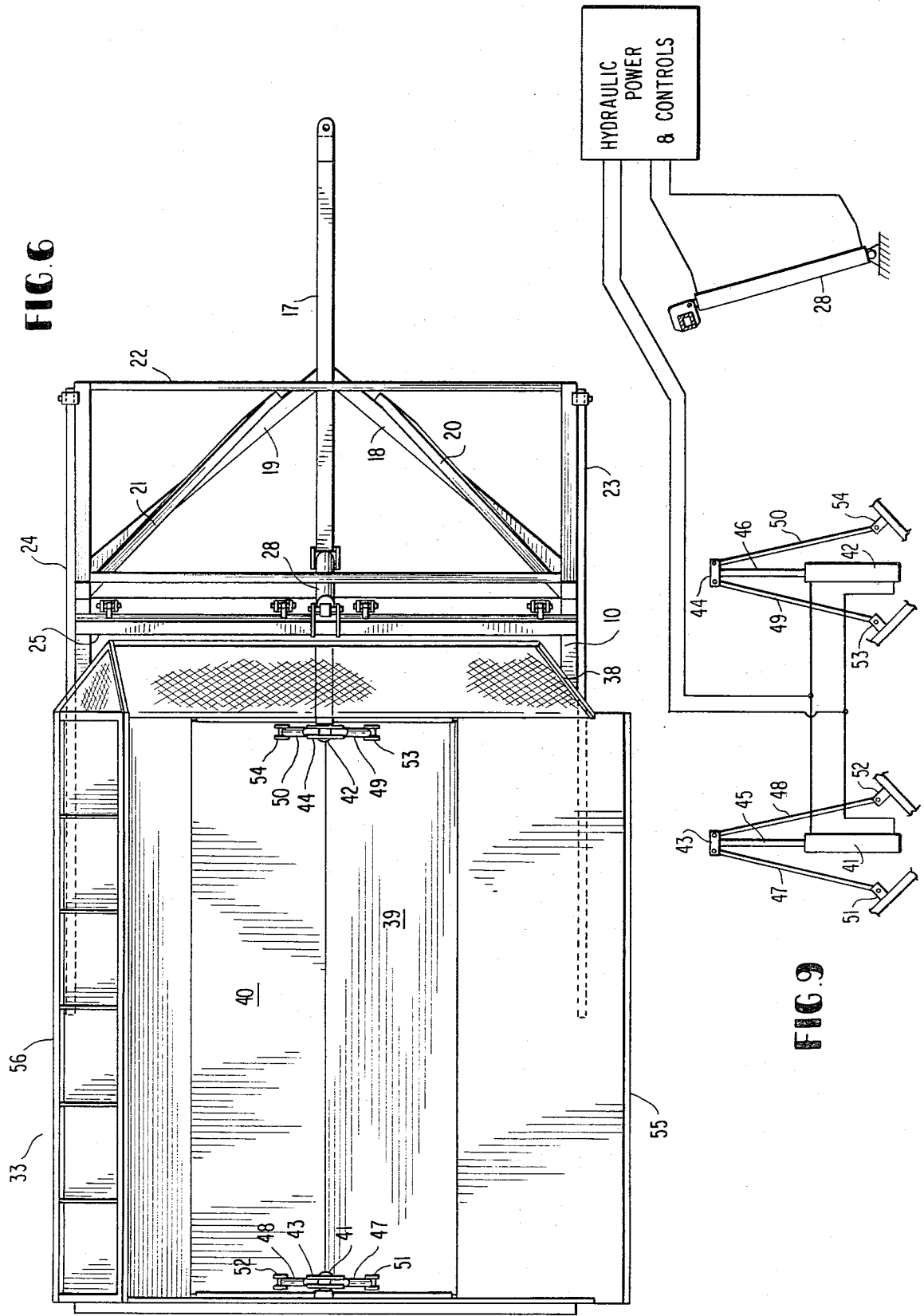

COTTON LOADER AND PACKER

This invention concerns a vehicle for transporting cotton from a mechanical picker to a cotton trailer, and for tamping down the cotton loaded in the trailer.

A common system for harvesting cotton today involves the use of a mechanical picker and a cotton trailer in which the cotton is transported to a gin. The trailer is ordinarily parked on a road or lane near the field, while the harvester travels back and forth, first picking the cotton and then traveling to the lane to deposit it in the trailer. The capacity of the hopper on a mechanical picker is commonly about one bale. Consequently, the interruptions in picking are frequent and the entire harvesting operation requires more time than would be needed, say, if the picker, when its hopper was full, could simply unload it right in the field. The more prolonged the harvesting operation, the more risk of running into bad weather which can cause substantial crop loss.

Common trailers are too large and heavy to be pulled around a field alongside a harvester. Consequently, there is a need for a smaller transport vehicle which could safely move about in a cotton field and also shuttle back and forth between the harvester and the parked trailer.

A second problem that arises in cotton harvesting has to do with the actual loading of the cotton into a cotton trailer. Because cotton is light and fluffy, it has to be tamped down in the cotton trailer in order to achieve a full load. At present, the most common way of doing this involves manual labor. Typically two or three men wearing heavy boots walk on the surface of the soft, spongy cotton in the trailer bed, compacting it in order to permit "topping off". It is dull, menial work in the extreme, and the wages required for it contribute significantly to the overall cost of the cotton harvesting operation.

We have invented a vehicle which can be used to transport cotton from a picker in the field to a trailer parked on an adjacent road, as well as to tamp down the cotton in the trailer in order to permit topping off. The vehicle comprises an elongated frame having an open end and a closed end, the frame consisting essentially of a U-shaped horizontal base with vertical posts rising up therefrom, the sides of the frame being far enough apart to permit the open end of the frame to straddle the end of a cotton transport trailer; ground-engaging wheels mounted to the frame; a basket for receiving and carrying cotton positioned above, and substantially centered over, the U-shaped base of the frame, the basket being supported by the vertical posts of the frame in such a manner as to be vertically movable from a lowest position in which the bottom of the basket is above the ground a distance of about 1 to 3 feet, to a highest position in which the basket can clear the top of a cotton trailer, the basket having a hinged bottom which can be opened in order to dump the basket's contents; means for moving the basket up and down between its lowest and highest positions; and means for opening and closing the hinged bottom of the basket.

Our cotton loading and packing vehicle can be used to shorten the time required for the harvesting operation and to reduce the manpower needs as well. With its lowered basket empty and its bottom closed, the vehicle can be moved into position beside a harvester in the field which is stopped and needs unloading. The contents of the picker's hopper are then dumped into the loader's basket. The harvester resumes picking cotton while the loader is moved to a cotton trailer parked on an access road leading to the field.

When the loader of the present invention reaches the cotton transport trailer, the basket is raised high and the open end of the loader is backed astraddle the trailer, with the basket of cotton poised above the trailer. The basket is then lowered somewhat, to prevent the cotton from dropping farther than necessary, and the bottom of the basket is opened, dumping the harvested cotton into the trailer.

When the trailer becomes nearly full with uncompacted cotton, the vehicle of the present invention can be used to tamp the cotton down to permit further loading. After dumping a load of cotton, the bottom of the loader's basket is closed and the basket is lowered repeatedly onto the surface of the cotton in the trailer, thereby tamping it down. To obtain a level and uniform load in the trailer, the hinged basket of the loader can also be moved to different positions across the trailer, with the tamping operation repeated at each location. Also, the lowered basket can be dragged over the surface of the cotton as a sort of a screed, to help provide a level load.

When the operation at the trailer is over, our loader's basket is raised to its uppermost position, and its bottom is closed; then the loader is pulled away from the trailer and the basket is re-lowered to its bottom position. The loader is now ready for a return trip to the field to pick up another hopperful of cotton from the harvester.

As stated above, the frame of our loader consists essentially of a U-shaped horizontal base with vertical posts rising up therefrom. Preferably there is a post at each corner of the closed end of the frame. If desired, the frame can also have side rails to give it added strength.

The interior width of the open end of the frame must be great enough to permit the loader to straddle the cotton trailer with which it is used. An interior width of about 9 feet or more is adequate for most, if not all, of the cotton trailers which are on the market today.

Similarly, the highest possible position of the basket must be sufficiently above the ground to clear the top of the cotton trailer with which the basket is used. So far as we are aware, a height of about 13 feet or more is adequate for all of the cotton trailers on the market today.

A preferred means for moving the basket up and down is a pair of arm members pivotably attached to, and extending from, vertical posts located at each corner of the closed end of the frame. The arm members are mirror images of one another and are so mounted on the posts that they can move the basket in a substantially vertical arc with the basket remaining parallel to the sides of the frame. The basket is carried by and between the arm members, preferably at the members' ends. In this arrangement the basket is preferably raised and lowered by motive means, such as a hydraulic operator, operating on the arm members. A hydraulic operator can also be used to open and close the bottom of the loader's basket.

For extra rigidity and durability, the arm members just described are hinged, elongated parallelograms. By "hinged" is meant that the parallelograms are not rigid at their corners, but that the sides of the figure are hinged together there, so that the angles of the parallelogram are adjustable. Both long sides of each parallelogram are then pivotally attached to one of the vertical posts. If those long sides are also pivotably attached, at their ends, to the loader's basket, that arrangement will serve to keep the basket level at every point along its up-and-down path of movement.

Our vehicle can be self-propelled, or it can be designed to be towed as a single axle or tandem trailer. Preferably, the vehicle has tow bar means, located at the closed end of the frame, which enables it to be towed by a farm tractor. Power to operate the means for raising and lowering the basket, as well as the means for opening and closing the bottom of the basket, can conveniently be obtained from the tractor's power train.

A preferred embodiment of our cotton loader is shown in the drawings accompanying this specification. Referring now to those drawings, FIG. 1 is a side view (partially broken away) of our cotton loader with its basket in its fully raised position, seen as the loader is being backed over a cotton trailer (shown in broken, dotted lines);

FIG. 2 is a side view of the same loader with its basket in its lowest position;

FIG. 3 is an overhead oblique view of the loader's basket;

FIG. 4 is a view of the open end of the loader with the basket in the lowered position;

FIG. 5 is a view of the closed end of the loader with the basket shown both in the lowered position (indicated by solid lines) and in the raised position (indicated by broken lines);

FIG. 6 is a top view of the loader;

FIG. 9 is a schematic depiction of the hydraulic circuit for the loader.

Figure 7:
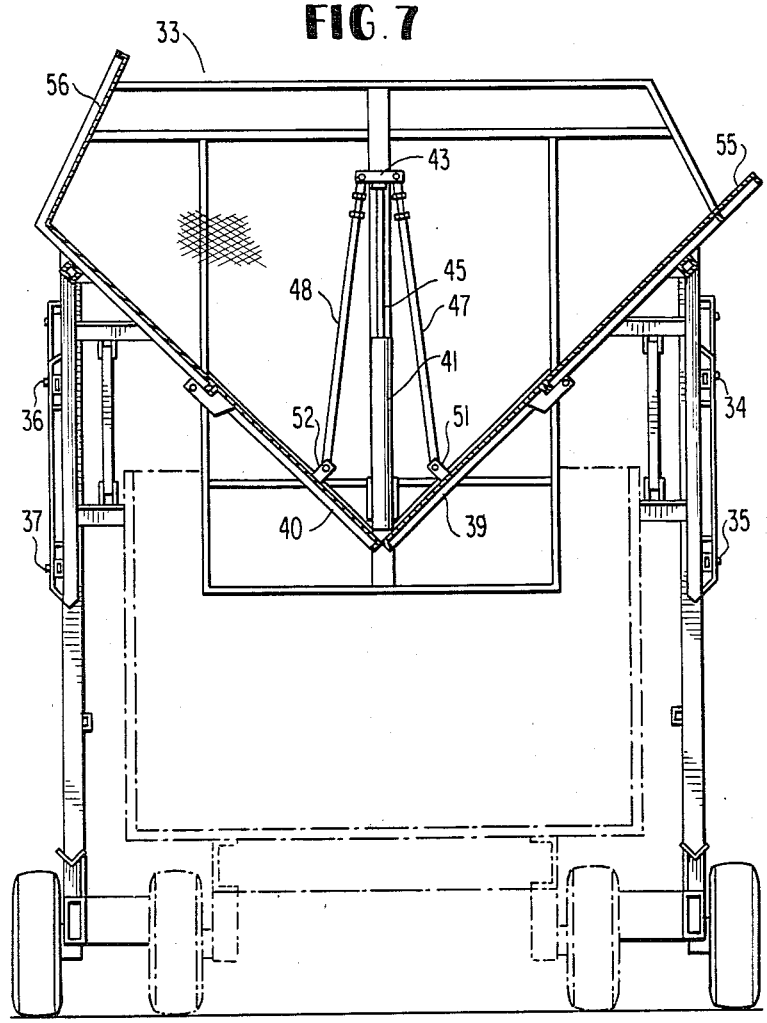
FIG. 7 is a view (partially in cross-section) of the open end of the loader astraddle a trailer (shown in broken, dotted lines) with the closed basket partially lowered into the bed of the trailer.
Figure 7A:
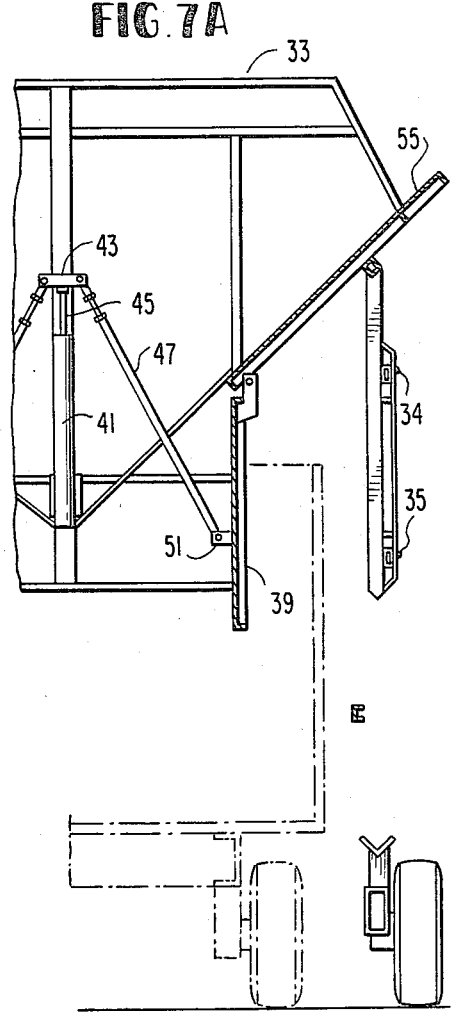
FIG. 7A is a partial view of FIG. 7, but with the basket's hinged bottom open.
Figure 8:
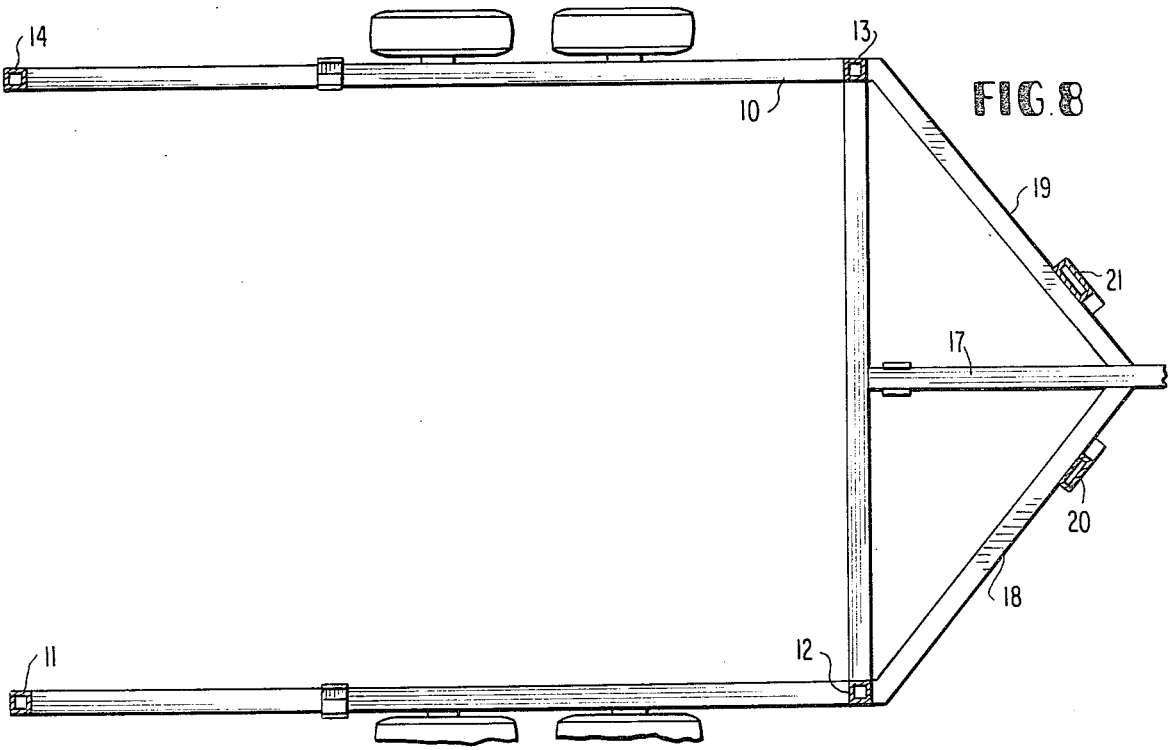
FIG. 8 is a view (partially broken away) along line 8—8 of FIG. 1.

Referring now to those drawings, it can be seen that in the preferred embodiment the loader frame is made up of a U-shaped base 10 having vertical posts 11-14 at all four corners, which are joined together by horizontal rails 15 and 16. Tow bar 17 is connected to the closed end of base 10 and is supported by braces 18 and 19. Additional brace members 20 and 21 help to support posts 12 and 13 at the closed end of base 10.

A box-like frame 22, which is attached to, and projects forward from the top of, posts 12 and 13, has pivotably mounted to the front of it two hinged parallelogram arm members 23 and 24. Stretcher members 25 and 26 connect arm members 23 and 24 together intermediate their ends. Piston rod 27 of hydraulic operator 28 is pivotably connected at its end to the lower stretcher member 26. Struts 29-32 are pivotably connected at both ends to stretcher members 25 and 26 to give arm members 23 and 24 added support.

A wire mesh basket (indicated generally as 33) is pivotably carried at points 34-37 on the ends of arm members 23 and 24. One long side 55 of basket 33 is slightly lower than the opposite side 56, in order to better receive the contents of a side-tipping hopper (not shown) of a cotton harvester. High side 56 of basket 33 is inclined inwardly at the top, to prevent cotton from bouncing out of the basket when it is dumped from the harvester's hopper.

The back wall 57 of basket 33 extends slightly higher than the front wall 58, in order to better retain any cotton which might be bounced or pushed backward by the air flow as the loader is pulled to the cotton trailer. Front wall 58 is bent outwardly near its top, thus providing an inclined portion 38 which helps funnel the cotton into the basket as the harvester's hopper is emptied into it.

The bottom of basket 33 is V-shaped, terminating in two hinged doors 39 and 40 which are opened and closed by hydraulic operators 41 and 42 which operate in tandem. The headed ends 43 and 44 of piston rods 45 and 46 are pivotably linked to connecting rods 47–50, which are in turn pivotably connected to clevises 51–54 attached to doors 39 and 49. Hoses (indicated schematically in FIG. 9) serve to link hydraulic operators 28, 41 and 42 to power and control means (also shown schematically in FIG. 9) which are mounted on the tractor to which the loader is hitched.

While the vehicle of the present invention has been described in terms of its usefulness for transporting cotton, we contemplate that it can also be used to carry other crops such as peanuts, potatoes, soybeans, vegetables, and fruits from field harvesting machines to trucks or trailers for transport to processing plants or to market.

We claim:
1. A vehicle for hauling cotton from a harvester to a transport trailer comprising
   an elongated frame having an open end and a closed end, said frame consisting essentially of a U-shaped horizontal base with vertical posts rising up therefrom, the sides of the frame being far enough apart to permit the open end of the frame to straddle the end of a cotton transport trailer;
   ground-engaging wheels mounted to said frame;
   a basket for receiving and carrying cotton, positioned above, and substantially centered over, the U-shaped base of the frame, the basket being supported by the vertical posts of the frame in such a manner as to be vertically movable from a lowest position in which the bottom of the basket is above the ground a distance of about 1 to 3 feet, to a highest position in which the basket can clear the top of a cotton trailer, said basket having a bottom opening through which the basket's contents can be dumped straight down;
   at least one gate hingedly connected to the basket along a horizontal axis to cover the bottom opening, said gate being swingable in a downward direction away from the bottom of the basket to uncover the opening and cause the basket's contents to be dumped, said gate being in a substantially vertical plane when in the open position, with the lowermost edge of said gate being at a lower elevation than the bottom of the basket;
   means for moving said basket up and down between its lowest and highest positions;
   and means for opening and closing said gate.
2. The vehicle of claim 1 wherein there is a pair of said gates hingedly connected to the basket to cover the bottom opening, and said gates are connected to the basket along parallel, horizontal axes that are located on opposite sides of the bottom opening.

3. The vehicle of claim 2 wherein there is a vertical post located at each of the corners of the closed end of the frame.

4. The vehicle of claim 3 wherein each of the two corner posts has an arm member pivotably attached thereto so that the arm member can move said basket in a substantially vertical arc, with said basket remaining parallel to the sides of the frame, said arm members being substantially mirror images of one another, said basket being carried by and between said pair of arm members, and said means for moving said basket up and down includes motive means operating on said arm members.

5. The vehicle of claim 4 wherein each arm member is a hinged, elongated parallelogram, both long sides of which are pivotably attached to the vertical post.

6. The vehicle of claim 4 wherein the motive means operating on the arm members is a hydraulic operator.

7. The vehicle of claim 6 wherein each arm member is a hinged, elongated parallelogram, both long sides of which are pivotably attached to the vertical post and to the basket.

8. The vehicle of claim 7 wherein the means for opening and closing said gate is a hydraulic operator.

9. The vehicle of claim 8, further comprising tow bar means, located at the closed end of the frame, which enables the vehicle to be towed by a farm tractor.

10. The vehicle of claim 9 wherein each of said gates is rectangular in shape, the gates are substantially equal in size, and the gates are connected to the basket along axes that are substantially at the same elevation.

11. The vehicle of claim 10 wherein said gates, when in the closed position, meet to form a V-shaped bottom to the basket.

12. The vehicle of claim 2 wherein each of said gates is rectangular in shape, the gates are substantially equal in size, and the gates are connected to the basket along axes that are substantially at the same elevation.

13. The vehicle of claim 12 wherein said gates, when in the closed position, meet to form a V-shaped bottom to the basket.

14. The vehicle of claims 1, 4, or 7, further comprising tow bar means, located at the closed end of the frame, which enables the vehicle to be towed by a farm tractor.

15. The vehicle of claims 1, 4, or 5, wherein the means for opening and closing said gate is a hydraulic operator.

* * * * *